US011465579B1

(12) United States Patent
Faruque et al.

(10) Patent No.: US 11,465,579 B1
(45) Date of Patent: Oct. 11, 2022

(54) ROOF SUPPORTED AIRBAG

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/224,409

(22) Filed: Apr. 7, 2021

(51) Int. Cl.
*B60R 21/213* (2011.01)
*B60R 21/232* (2011.01)
*B60R 21/233* (2006.01)
*B60R 21/214* (2011.01)
*B60R 21/231* (2011.01)

(52) U.S. Cl.
CPC .......... *B60R 21/213* (2013.01); *B60R 21/214* (2013.01); *B60R 21/232* (2013.01); *B60R 21/233* (2013.01); *B60R 2021/23107* (2013.01); *B60R 2021/23153* (2013.01); *B60R 2021/23161* (2013.01); *B60R 2021/23192* (2013.01)

(58) Field of Classification Search
CPC ............ B60R 21/01554; B60R 21/213; B60R 21/214; B60R 21/232; B60R 21/233; B60R 2021/23107; B60R 2021/23161; B60R 2021/23192; B60R 2021/23153; B60R 2021/23308; B60R 2021/23316; B60R 2021/23386
See application file for complete search history.

(56) References Cited

U.S. PATENT DOCUMENTS

| 3,795,412 | A | 3/1974 | John | |
|---|---|---|---|---|
| 6,293,581 | B1 * | 9/2001 | Saita | ...................... B60R 21/213 280/730.2 |
| 6,431,587 | B1 * | 8/2002 | O'Docherty | .......... B60R 21/232 280/730.2 |
| 6,502,853 | B2 * | 1/2003 | Keshavaraj | ............. B60R 21/23 280/730.2 |
| 7,243,943 | B2 * | 7/2007 | Ohrvall | ............... B60R 21/2338 280/730.2 |
| 8,087,690 | B2 | 1/2012 | Kim | |
| 8,573,634 | B2 * | 11/2013 | Choi | ..................... B60R 21/232 280/730.2 |
| 9,731,628 | B1 * | 8/2017 | Rao | ......................... B60N 2/01 |
| 9,789,840 | B2 | 10/2017 | Farooq et al. | |
| 9,981,622 | B2 * | 5/2018 | Ohmura | ................. G01C 21/34 |

(Continued)

FOREIGN PATENT DOCUMENTS

| JP | 2019043474 A | * | 3/2019 |
| JP | 2019130944 A | | 8/2019 |

*Primary Examiner* — Laura Freedman
(74) *Attorney, Agent, or Firm* — Frank A. MacKenzie; Bejin Bieneman PLC

(57) ABSTRACT

A vehicle includes a roof and an airbag supported by the roof. The airbag is inflatable downwardly from the roof to an inflated position surrounding a seatback. The airbag has non-inflatable panels and inflatable chambers in alternating arrangement around the seatback in the inflated position. A widest one of the non-inflatable panels is adjacent the back of the seatback in the inflated position. The widest one of the non-inflatable panels is wider in a horizontal plane that the other non-inflatable panels.

20 Claims, 7 Drawing Sheets

(56) References Cited

U.S. PATENT DOCUMENTS

| | | |
|---|---|---|
| 10,328,889 B2 | 6/2019 | Sugie et al. |
| 10,703,324 B2 * | 7/2020 | Hill ...................... B60R 21/232 |
| 10,730,470 B2 | 8/2020 | Choi |
| 2004/0256842 A1 * | 12/2004 | Breed ..................... B60R 21/30 |
| | | 280/730.1 |
| 2005/0057025 A1 * | 3/2005 | Hofmann .............. B60R 21/232 |
| | | 280/730.2 |
| 2022/0063546 A1 * | 3/2022 | Jaradi ................. B60R 21/2334 |

* cited by examiner

ROOF SUPPORTED AIRBAG

BACKGROUND

A vehicle may include one or more airbags deployable during vehicle impacts to absorb energy from occupants of the vehicle during the impact. The airbag may be a component of an airbag assembly including a housing supporting the airbag and an inflation device in communication with the airbag for inflating the airbag from an uninflated position to an inflated position.

DETAILED DESCRIPTION

Figure 1:
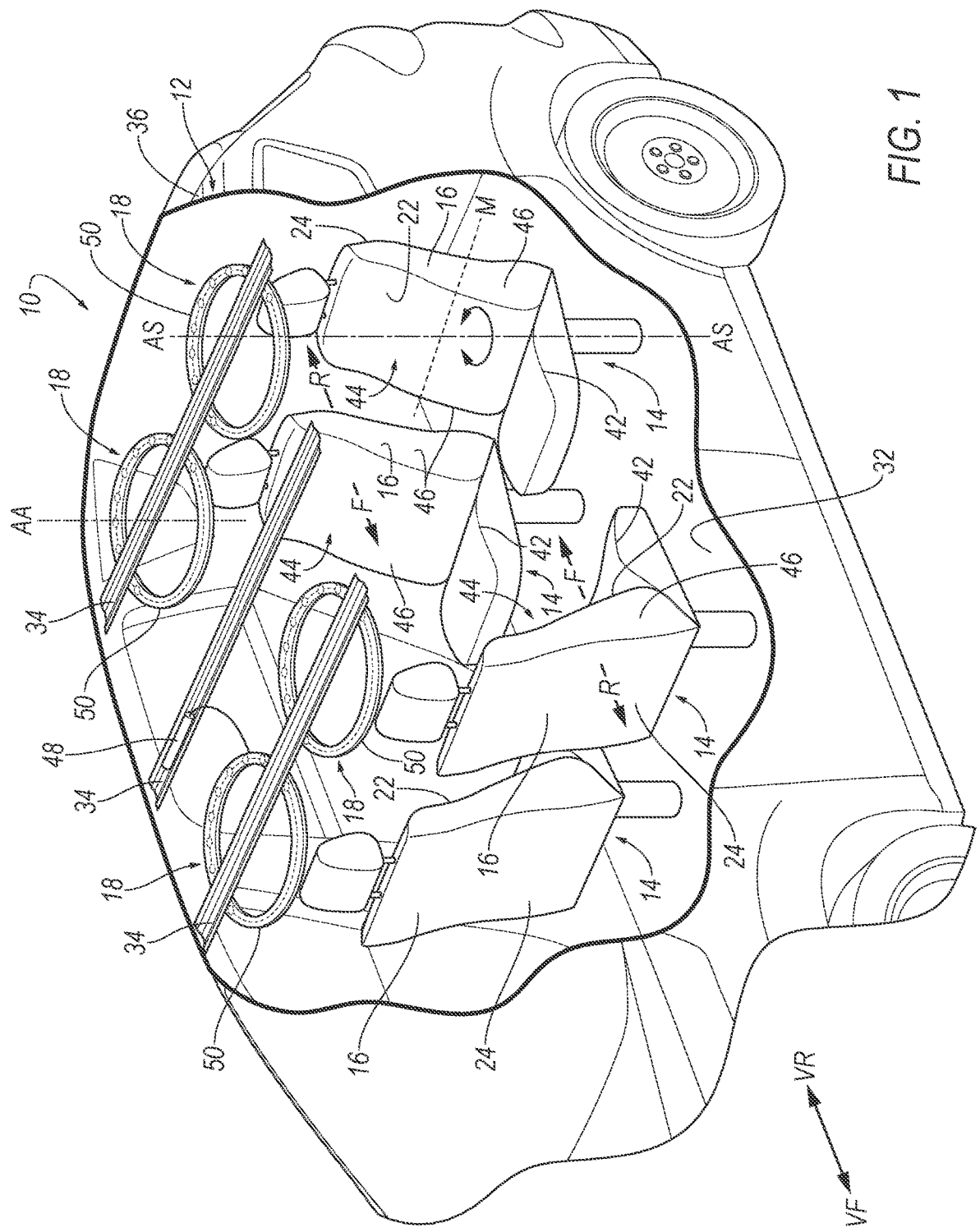
FIG. 1 is a cut-away view of a vehicle showing airbag assembles supported by cross-members of a roof above seats.

A vehicle includes a roof, a seatback having a front and a back, and an airbag supported by the roof and inflatable downwardly from the roof to an inflated position surrounding the seatback. The airbag has non-inflatable panels and inflatable chambers in alternating arrangement around the seatback in the inflated position. A widest one of the non-inflatable panels is adjacent the back of the seatback in the inflated position. The widest one of the non-inflatable panels is wider in a horizontal plane that the other non-inflatable panels.

The inflatable chambers may be tubular. The inflatable chambers may be elongated downwardly relative to the roof. The seatback includes a horizontal midline and the airbag may be inflatable downwardly from the roof to below the midline. The non-inflatable panels may be elongated downwardly relative to the roof.

The inflatable chambers may be elongated downwardly relative to the roof.

The front of the seatback defines an occupant seating area and the seatback may be between the occupant seating area and the widest one of the non-inflatable panels. The seatback may include a first bolster and a second bolster spaced from each other horizontally with the occupant seating area therebetween and the widest one of the non-inflatable panels may extend from the first bolster to the second bolster. The airbag may surround the occupant seating area in the inflated position. The seatback includes a horizontal midline and the widest one of the non-inflatable panels may extend downwardly below the midline.

The seatback has a first bolster and a second bolster spaced from each other horizontally and the widest one of the non-inflatable panels may extend from the first bolster to the second bolster in the inflated position.

The airbag may be rotatable relative to the roof about an axis transverse to the roof. The vehicle includes a seat including the seatback and the seat may be rotatable about an axis transverse to the roof. The rotation of the airbag and rotation of the seat and the airbag may be synchronized. The vehicle may include a computer having a processor and a memory storing instructions executable by the processor to rotate the airbag based on rotation of the seat.

The vehicle includes an inflator that may be supported by the roof and connected to a plurality of the inflatable chambers.

An assembly includes a housing and an airbag supported by the housing and inflatable away from the housing along an axis transverse to the housing. The airbag has non-inflatable panels and inflatable chambers in alternating arrangement. One of the non-inflatable panels is wider the other non-inflatable panels in a plane transverse to the axis.

The inflatable chambers may be tubular. The inflatable chambers may be elongated away from the housing. The non-inflatable panels may be elongated from the housing.

With reference to the figures, where like numerals indicate like elements, a vehicle 10 includes a roof 12, a seatback 16, and an airbag 20 supported by the roof 12 and inflatable downwardly from the roof 12 to an inflated position surrounding the seatback 16. The seatback 16 has a front 22 and a back 24. The airbag 20 has non-inflatable panels 26 and inflatable chambers 28 in alternating arrangement around the seatback 16 in the inflated position. A widest one 30 of the non-inflatable panels 26 is adjacent the back 24 of the seatback 16 in the inflated position. The widest one 30 of the non-inflatable panels 26 (hereinafter referred to as "the widest non-inflatable panel 26") is wider in a horizontal plane that the other non-inflatable panels 26.

As the airbag 20 is inflated to the inflated position, the inflatable chambers 28 deploy the airbag 20 downwardly from the roof 12 toward the seatback 16. The non-inflatable chambers 28, being in alternating arrangement with the inflatable chambers 28, connect inflatable chambers 28 and reduce the amount of inflation medium to inflate the airbag 20 to the inflated position. Since the airbag 20 surrounds the seatback 16 in the inflated position, the airbag 20 controls the kinematics of an occupant regardless of the direction in which the occupant faces. For example, a seat 14, of which the seatback 16 is a component, may face in any direction in the vehicle 10, whether in a fixed position or rotatable to face various directions, and the airbag 20 surrounds the seatback 16 in the inflated position to control the kinematics of the occupant in any direction. The widest non-inflatable panel 26 is adjacent the seatback 16 to use the seatback 16 as a reaction surface for the airbag 20. Specifically, in the event the occupant move away from the seatback 16 and into the airbag 20 during a vehicle 10 impact, the occupant urges the airbag 20 away from the seatback 16. The widest non-inflatable panel 26 anchors the airbag 20 to the seatback 16 to limit movement of the airbag 20 away from the seatback 16.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input. In such an example, seats 14 of the vehicle 10 may be in various rotational positions in the vehicle 10, as described further below. In an example in which the vehicle 10 is autonomous, the vehicle 10 may include a computer programmed to operate the vehicle 10 independently of the intervention of a human driver, completely or to a lesser degree. The computer may be programmed to control the propulsion, braking, steering, and/or other vehicle systems based at least in part on data received from sensors.

Figure 2:
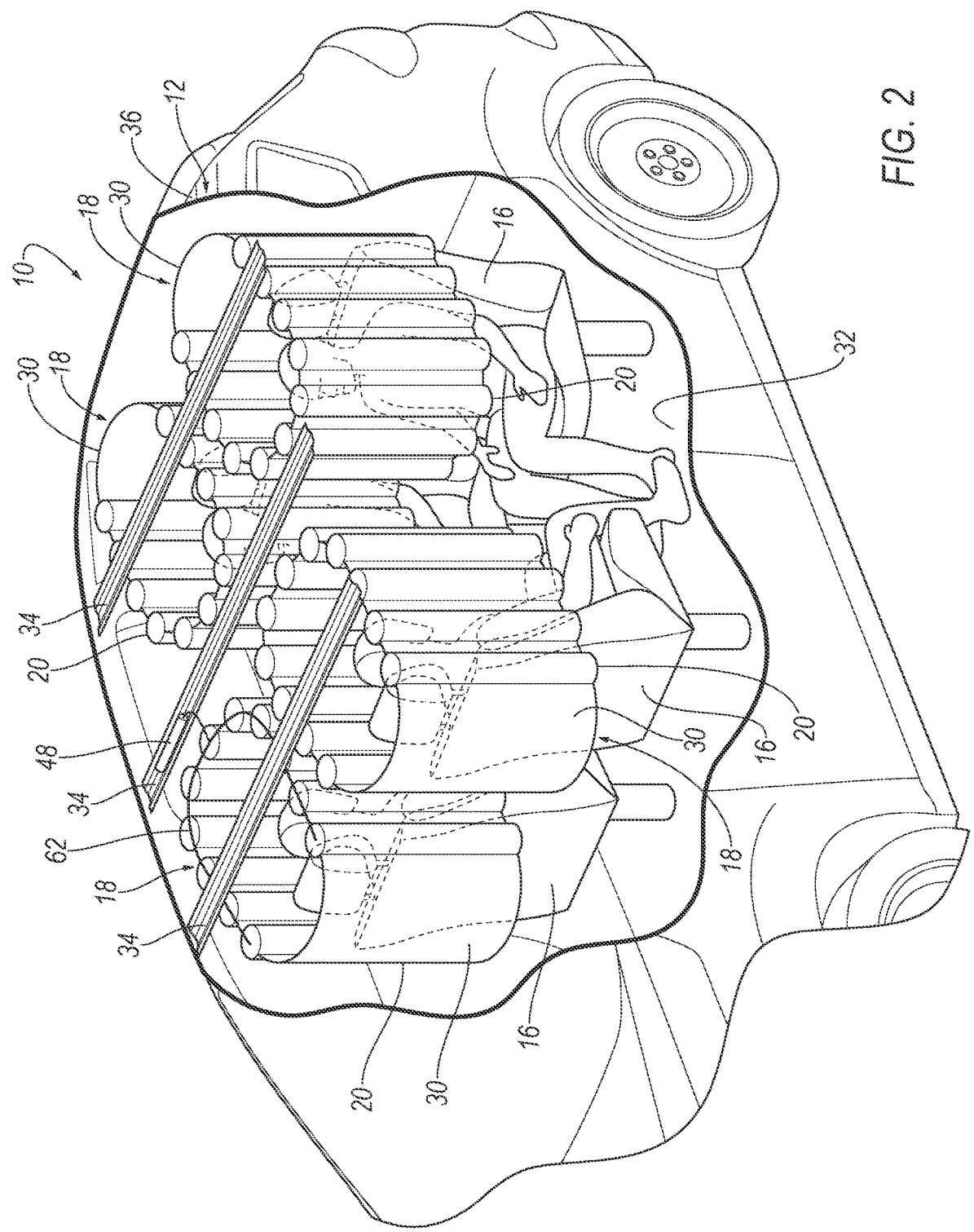
FIG. 2 is a cut-away view of the vehicle with airbags of the airbag assemblies in inflated positions.
Figure 3:
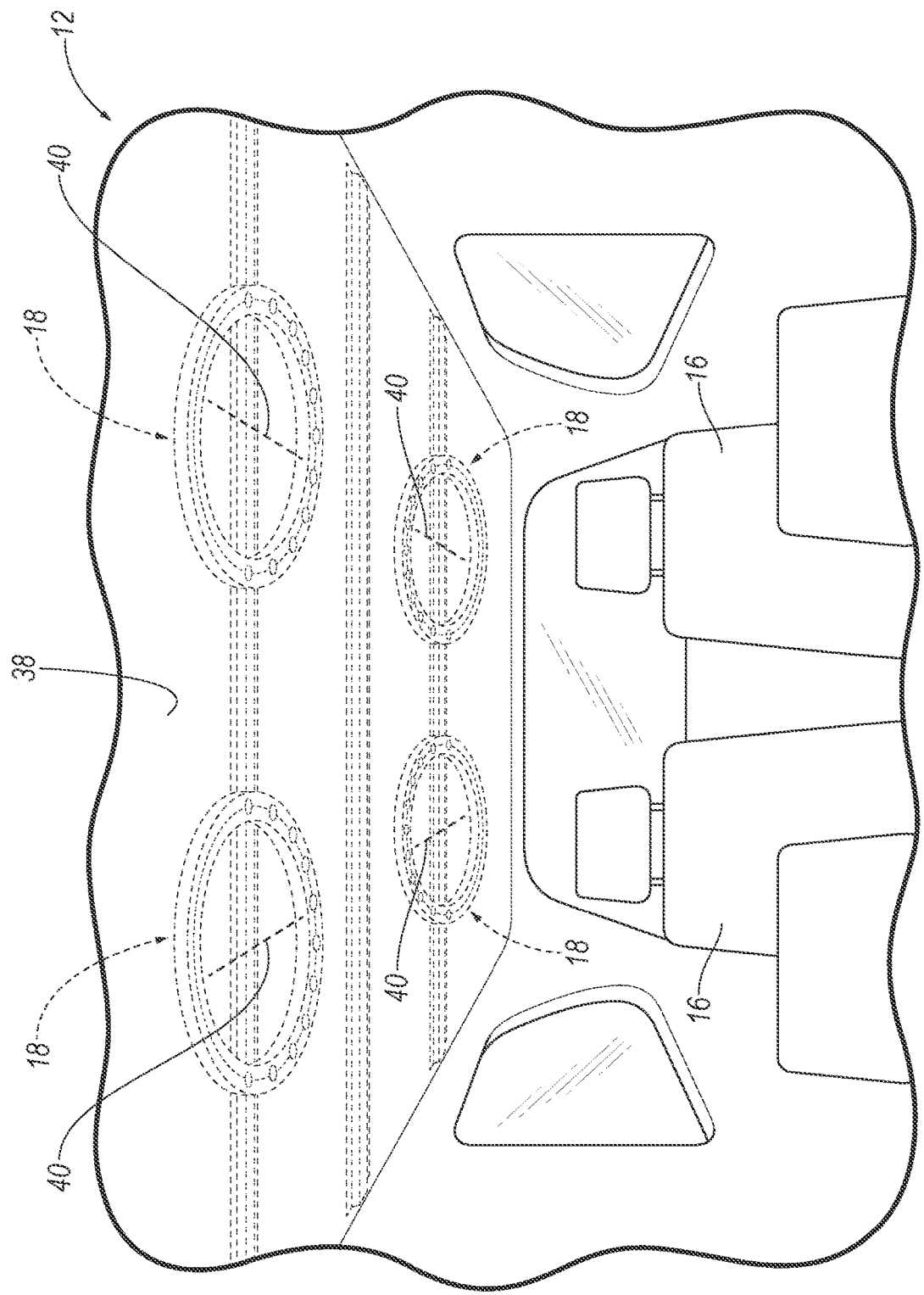
FIG. 3 is a perspective view of the roof of the vehicle with the airbags in uninflated positions.

With reference to FIGS. 1-3, the vehicle 10 includes a vehicle body. The vehicle body may define a passenger cabin to house occupants, if any, of the vehicle 10. The vehicle body includes body panels partially defining an exterior of the vehicle 10. The body panels may present a class-A surface, e.g., a finished surface exposed to view by a customer and free of unaesthetic blemishes and defects. The body panels include, e.g., an exterior panel 36 of the roof 12, floor 32, fenders, a hood, doors, etc.

The roof 12 provides cover for occupants of the vehicle 10. The roof 12 may include cross-beams 34 and an exterior panel 36. A headliner 38 may be supported by the roof 12 above the passenger cabin, and a headliner 38, shown in FIG. 2. The cross-beams 34 may support the exterior panel 36 and the headliner 38. The cross-beams 34 may be steel, aluminum, carbon fiber, or any other suitable material. The cross-beams 34 may be elongated along the cross-vehicle axis. The headliner 38 and the exterior panel 36 provide class-A surfaces to the roof 12, i.e., surfaces specifically manufactured to have a high-quality, finished aesthetic appearance free of blemishes, etc.

The headliner 38 may include a tear seam 40. The tear seam 40 is designed to rupture upon inflation of the airbag 20, i.e., is positioned, sized, has a rupture strength, etc., so that the airbag 20 breaks the tear seam 40 when the airbag 20 is inflated. The tear seam 40 may be weaker than a portion of the headliner 38 adjacent the tear seam 40, e.g., the tear seam 40 may be relatively thinner, a relatively weaker material, etc. The tear seam 40 may connect panels of the headliner 38, e.g., may be breakaway stitches.

With reference to FIGS. 1-2, the seat 14 includes the seatback 16 and a seat bottom 42. The seatback 16 may be supported by the seat bottom 42 and may be stationary or movable relative to the seat bottom 42. The seatback 16 and the seat bottom 42 may be adjustable in multiple degrees of freedom. Specifically, the seatback 16 and the seat bottom 42 may themselves be adjustable, in other words, adjustable components within the seatback 16 and/or the seat bottom 42, and/or may be adjustable relative to each other.

The seatback 16 may include a seatback frame (not shown) and a covering supported on the seatback frame. The seatback frame may include tubes, beams, etc. The seatback frame may be of any suitable metal or plastic material. The covering may include upholstery and padding. The upholstery may be cloth, leather, faux leather, or any other suitable material. The upholstery may be stitched in panels around the frame. The padding may be between the covering and the seatback 16 frame and may be foam or any other suitable material.

The front 22 of the seatback 16 faces seat-forward F and the back 24 of the seatback 16 faces seat-rearward R. When the seat 14 is forward facing, the front 22 of the seatback 16 faces vehicle-forward VF and the back 24 of the seatback 16 faces vehicle-rearward VR, and the front 22 and back 24 of the seatback 16 face in other directions when the seatback 16 is not forward-facing.

The seat 14, specifically the seatback 16 and the seat bottom 42, define an occupant seating area 44. The occupant seating area 44 is the area occupied by an occupant when properly seated in the seat 14. The occupant seating area 44 is at the front 22 of the seatback 16. In other words, the front 22 of the seatback 16 is between the occupant seating area 44 and the back 24 of the seatback 16.

The seatback 16 may have bolsters 46 on opposite sides of the occupant seating area 44. The bolsters 46 are elongated, and specifically, are elongated in a generally upright direction when the seatback 16 is in a generally upright position. The bolsters 46 are spaced from each other horizontally with the occupant seating area 44 therebetween. The bolsters 46 define cross-seat 14 boundaries of the seatback 16, i.e., the seatback 16 terminates at the outer boundary the bolsters 46. The bolsters 46 may protrude in a seat-forward F direction relative to the occupant seating area 44, i.e., on opposite sides of the torso and shoulders of an occupant seated on the seat 14. The protrusion of the bolsters 46 relative to the occupant seating area 44 may be defined by the frame and/or the covering of the seatback 16. In the example shown in the Figures, the size and shape of both the frame and the covering of the seatback 16 form the bolsters 46.

The vehicle 10 includes one or more seats 14. The example shown in FIG. 1 includes four seats 14, and the vehicle 10 may include any suitable number of seats 14. The seat 14 may be arranged in the passenger cabin in any suitable position, i.e., as front seats 14, rear seats 14, third-row seats 14, etc. The seat 14 may be movable relative to the floor 32 to various positions, e.g., movable fore-and-aft and/or cross-vehicle 10. The seat 14 may be of any suitable type, e.g., a bucket seat as shown in FIG. 1. In examples in which the vehicle 10 includes more than one seat 14, the vehicle 10 may include an airbag 20 for any number or all of the seats 14. For example, as shown in FIGS. 1-3, the vehicle 10 includes four seats 14 and four airbags 20, i.e., one airbag 20 for each seat 14.

With reference to FIG. 1, each seat 14 assembly may rotate about an axis AS transverse to the roof 12. The axis AS about which the seat 14 rotates may extend through the floor 32 and the roof 12, e.g., may be a vertical axis that extends through the roof 12 and the floor 32. The seat 14 may, for example, rotate between a forward-facing position, a rearward-facing position, a rightward-facing position, a leftward-facing position, and/or positions therebetween. In the forward-facing position, an occupant of the seat 14 assembly faces the front dash. The seat 14 assemblies may rotate completely, i.e., 360°, about the axis AS. The seat 14 may rotate between fixed positions, e.g., the forward-facing position and the rearward-facing position, or may be rotatable to an infinite number of positions.

With reference to FIGS. 1-3, the vehicle 10 may include one more airbag assemblies 18. The airbag assembly 18 includes the airbag 20. The airbag assembly 18 includes an inflator 48 and it should be appreciated that more than one airbag assembly 18 may share a common inflator 48. The airbag assembly 18 may include a housing 50 supporting the airbag 20.

The housing is shown, for example, in FIG. 1 and is not shown in the other figures so as to illustrate other features. In examples including the housing 50, the inflator 48 may be supported by the housing 50. The housing 50 may be rigid relative to the airbag 20 and may be, for example, metal, plastic, etc. The housing 50 may be mounted to the vehicle 10, e.g., to the roof 12 of the vehicle 10. Specifically, the housing 50 may be mounted to one or more of the cross-beams 34 of the roof. The housing 50 acts as a reaction surface for the airbag 20 as the airbag 20 inflates.

With reference to FIG. 1, the inflator 48 is in fluid communication with the airbag 20. Specifically, the inflator 48 may be in fluid communication with each of the inflatable chambers 28, i.e., one inflator 48 may inflate each of the inflatable chambers 28. The inflator 48 expands the inflatable chambers 28 with inflation medium, such as a gas, to move the airbag 20 from the uninflated position to the inflated position. The inflator 48 may be supported by any suitable component. For example, the inflator 48 may be supported by the housing 50 in examples including the housing 50. The inflator 48 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 48 may be, for example, be connected to the inflation chamber through fill tubes 60, diffusers, etc. One example of the inflator 48 with fill tubes 60 is shown in FIG. 1. Only one example of the inflator 48 and fill tubes 60 is shown in FIG. 1 so as to adequately show other features, and it should be appreciated that the vehicle 10 includes one or more additional inflators 48 and/or fill tubes 60 for the other airbag assemblies 18.

The airbag 20 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

With reference to FIGS. 1-3, the airbag 20 is supported by the roof 12. The airbag 20 is inflatable downwardly from the roof 12 to the inflated position. For example, in examples including the housing 50, the airbag 20 is supported by the housing 50 and the housing 50 is supported by the roof 12. In such an example, the airbag 20 is inflatable away from the housing 50 along an axis transverse to the housing 50 to the inflated position.

In the inflated position, the airbag 20 surrounds the seatback 16. Specifically, the airbag 20 extends continuously around the seatback 16 in a generally vertical plane. In the example shown in the figures, the airbag 20 extends continuously around the front 22, back 24, and bolsters 46 of the seatback 16. The airbag 20 surrounds the seatback 16 when the seat 14 is in any facing position. Specifically, in examples in which the seat 14 is rotatable about an axis AS transverse to the roof 12 to various positions, the airbag 20 in the inflated position surrounds the seatback 16 in any position of the seat 14.

The airbag 20 surrounds the occupant seating area 44 in the inflated position. The seatback 16 includes a horizontal midline M and the airbag 20 may be inflatable downwardly from the roof 12 to below the midline M. For example, when an occupant is seated in the seat 14, the airbag 20 may abut the knees of the occupant.

Figure 4:
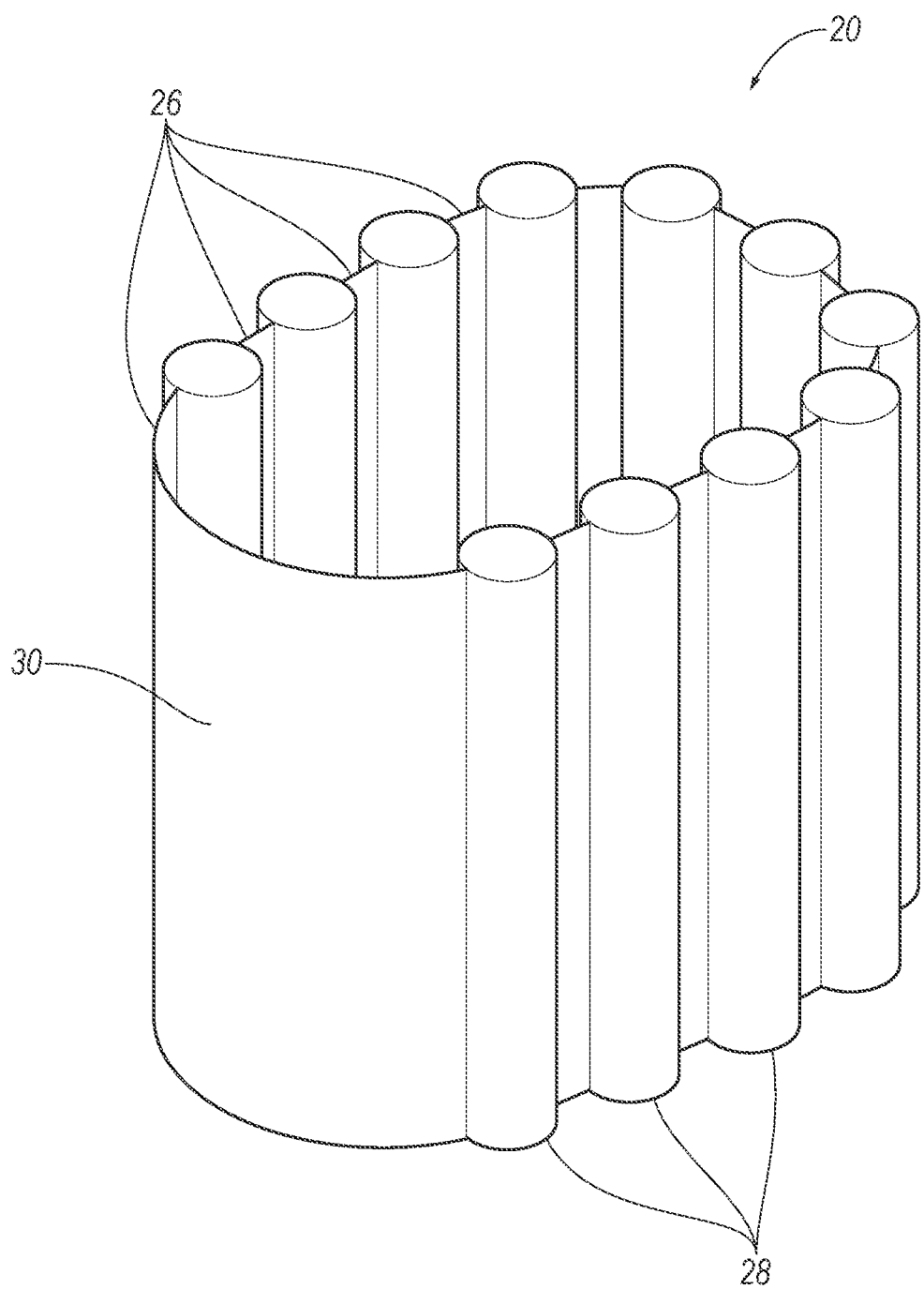
FIG. 4 is a perspective view of the airbag in the inflated position.
Figure 5:
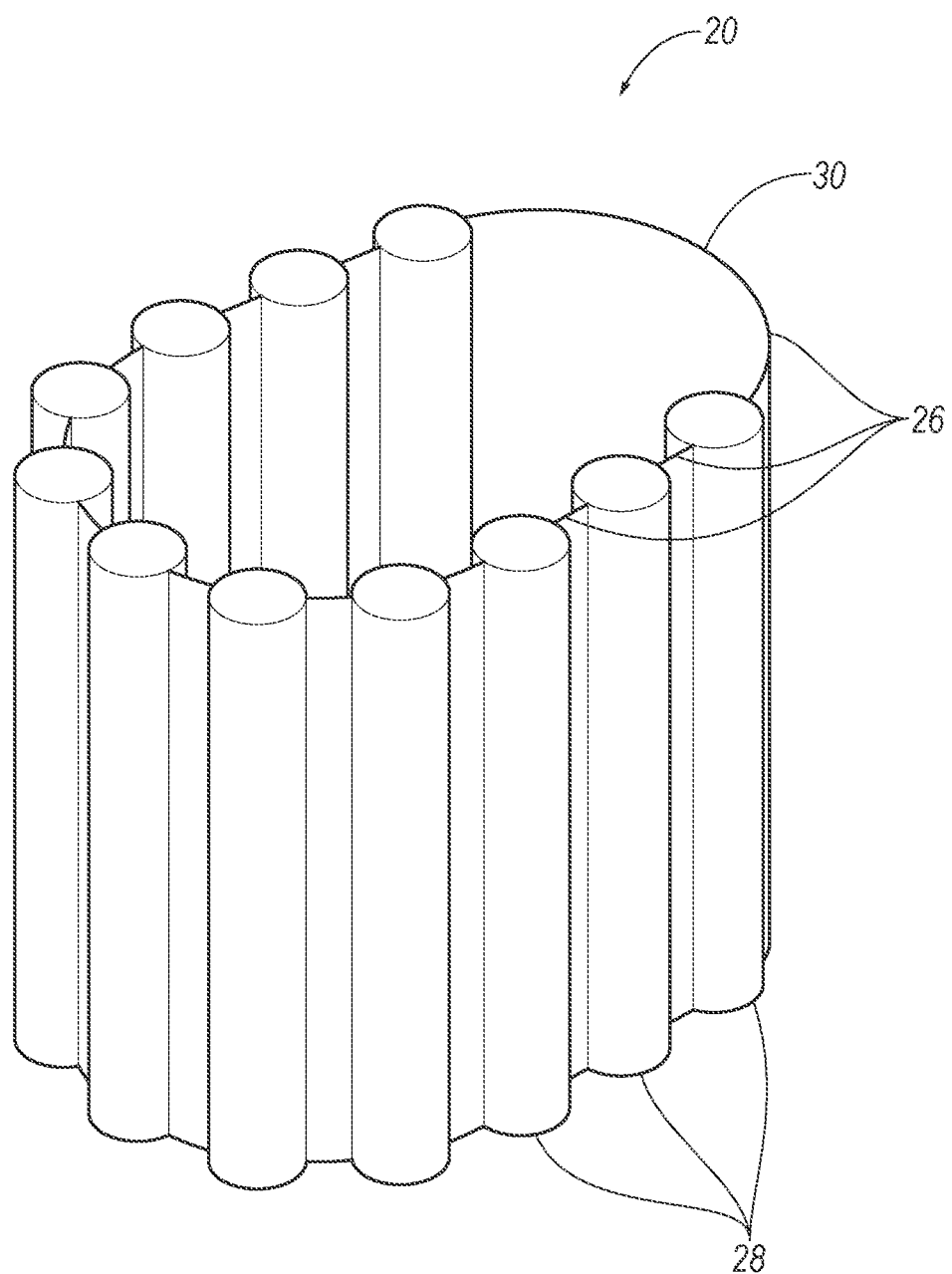
FIG. 5 is another perspective view of the airbag in the inflated position.
Figure 6:
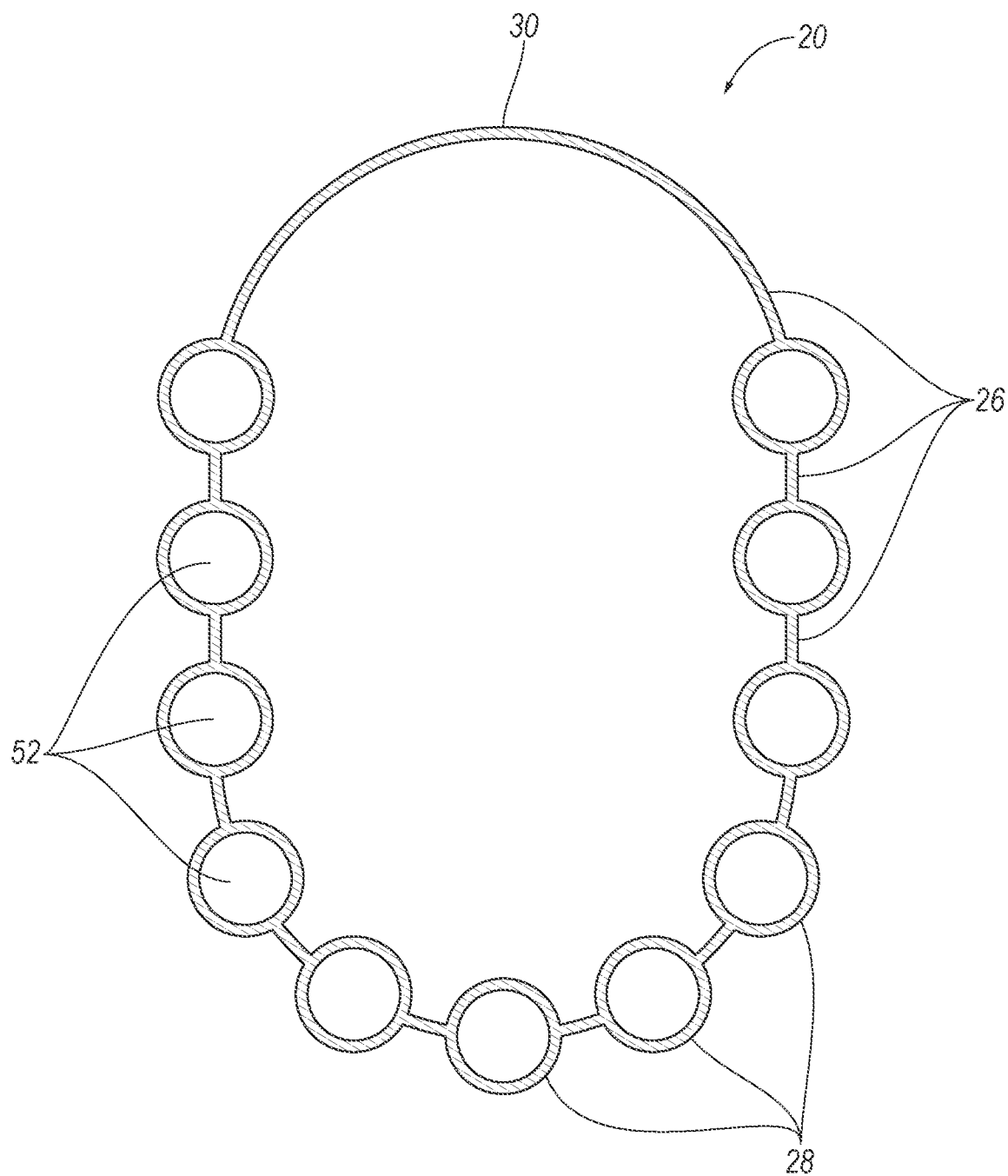
FIG. 6 is a cross-sectional view of the airbag including inflatable chambers and non-inflatable panels.

With reference to FIGS. 4-6, as set forth above, the airbag 20 has non-inflatable panels 26 and inflatable chambers 28 in alternating arrangement around the seatback 16 in the inflated position. In other words, each non-inflatable panel 26 extends from one inflatable chamber 28 to another inflatable chamber 28, and each inflatable chamber 28 extends from one non-inflatable panel 26 to another non-inflatable panel 26. In the inflated position, the non-inflatable panels 26 and the inflatable chambers 28 in combination are arranged in a rounded configuration around the seatback 16. Specifically, the housing 50 may be circular, as shown in FIG. 1, and the airbag 20 may be in an oval shape in the inflated position, as shown in FIGS. 2 and 4-6. The non-inflatable panels 26 and the inflatable chambers 28 may be of the same material type.

With reference to FIG. 2, the inflatable chambers 28 may be elongated downwardly relative to the roof 12, i.e., the longest dimension of the inflatable chamber 28 is downward relative to the roof 12. Each inflatable chamber 28 defines a volume 52 inflatable by inflation medium from the inflator 48. When the inflatable chambers 28 are inflated, the inflatable chambers 28 drive the non-inflatable panels 26 downwardly away from the roof 12 to position the inflatable chambers 28 and the non-inflatable chambers 28 around the seatback 16. The inflatable chambers 28 may be tubular. For example, the inflatable chambers 28 may have a round cross-section, e.g., a circular cross-section. Each of the inflatable chambers 28 may have the same size and shape, as shown in the example in the figures. Each of the inflatable chambers 28 may extend from the roof 12 to below the midline M of the seatback 16 in the inflated position.

The non-inflatable panels 26 may be elongated downwardly relative to the roof 12. As an example, the non-inflatable panels 26 may be continuous from the roof 12 to an end of the airbag 20 distal to the roof 12. The non-inflatable panels 26, including the widest one 30 of the non-inflatable panels 26, may extend from the roof 12 to below the midline M of the seatback 16 in the inflated position. The non-inflatable panels 26 may each have the same length downwardly from the roof 12 in the inflated position.

With reference to FIGS. 4-6, the non-inflatable panels 26 are uninflatable. Specifically, the non-inflatable panels 26 are not in fluid communication with the volume 52 of the inflatable chambers 28 inflated by the inflation medium and are not inflated when the inflation chamber is inflated. In other words, the uninflatable panel is separated from any inflatable volume of the airbag 20. The uninflatable panel does not include a volume inflatable by inflation medium.

The widest one 30 of the non-inflatable panels 26 is wider the other non-inflatable panels 26 in a plane transverse to the axis, e.g., in a horizontal plane. As an example the widest one 30 of the non-inflatable panels 26 may be more than 5 times wider than the other non-inflatable panels 26. In the example shown in the figures, the widest one 30 of the non-inflatable panels 26 is more than ten times wider than the other non-inflatable panels 26. Each of the non-inflatable panels 26 other than the widest one 30 may have the same width, as shown in the example in the figures.

The widest one 30 of the non-inflatable panels 26 is adjacent the back 24 of the seatback 16 in the inflated position. Specifically, the seatback 16 is between the occupant seating area 44 and the widest one 30 of the non-inflatable panels 26. In this configuration, the widest one 30 acts as a reaction surface for the rest of the airbag 20 in the event the occupant impacts the airbag 20 during a vehicle 10 impact.

The widest one 30 of the non-inflatable panels 26 may be wider than the back 24 of the seatback 16. Specifically, the widest one 30 of the non-inflatable panels 26 may extend from the one bolster 46 to the other bolster 46. One of the inflatable chambers 28 connected directly to the widest one 30 of the non-inflatable panels 26 may on one of the bolsters 46 seat-outboard of the bolster 46 and the other of the inflatable chambers 28 connected directly to the widest one 30 of the non-inflatable panels 26 may be on the other of the bolsters 46 seat-outboard of the bolster 46.

The airbag 20 may be rotatable relative to the roof 12 about an axis AA transverse to the roof 12. Specifically, the rotation of the airbag 20 and rotation of the seat 14 and the airbag 20 may be synchronized. In other words, when the seat 14 is rotated, the airbag 20 is rotated accordingly so that the widest one 30 of the non-inflatable panels 26 is positioned at the back 24 of the seatback 16.

Figure 7:
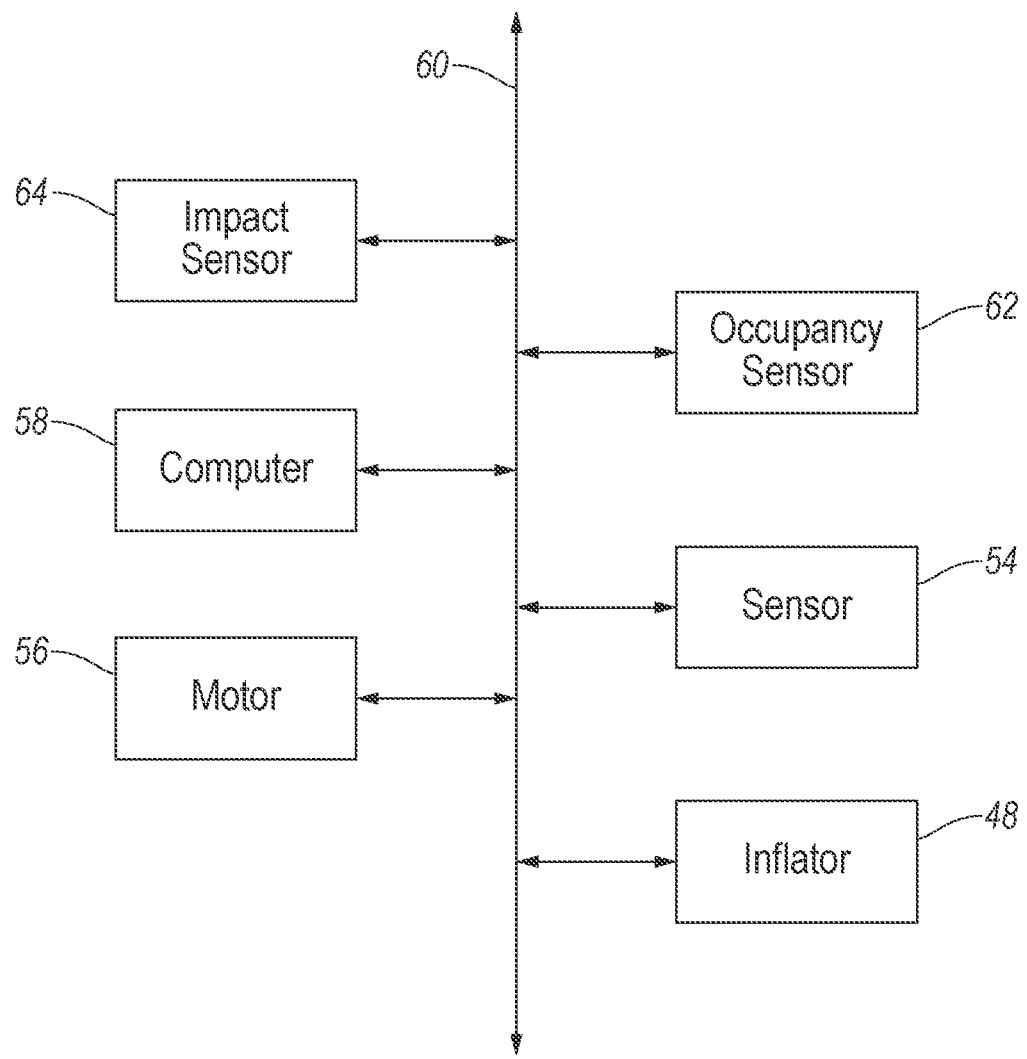
FIG. 7 is a block diagram of a system of the vehicle.

With reference to FIG. 7, the vehicle 10 includes a sensor 54 that senses the position of the seat 14. The sensor 54 may be, for example, a seat sensor connected to the seat 14 to measure the rotational position of the seat 14, e.g., a rotary encoder, a rotary variable differential transformer, etc. As another example, the sensor 54 may be an image sensor supported in the vehicle 10 and aimed at to seat 14. In such an example, images from the image sensor are used to determine the rotational position of the seat 14.

The vehicle 10 may include a motor 56 between the roof 12 and the airbag assembly 18, e.g., the housing 50, to rotate the airbag assembly 18 relative to the roof 12. Specifically, the motor 56 may rotate the housing 50 about the axis AA. The motor 56 is operated based on detected rotation of the seat 14 by the sensor 54.

The vehicle 10 may include a computer 58 having a processor and a memory storing instructions executable by the processor to rotate the airbag 20 based on rotation of the seat 14. The computer 58 may be, for example, a restraints control module. In the event an occupant rotates the seat 14, the computer 58 rotates the airbag 20 synchronously with the seat 14. The computer 58 determines position of the seat 14 based on input from the sensor 54. When the computer 58 detects that the seat 14 is rotating or has rotated, the computer 58 instructs the motor 56 to adjust the rotation of the airbag assembly 18 synchronously with the seat 14. Use of "in response to," "based on," and "upon determining" herein indicates a causal relationship, not merely a temporal relationship.

The vehicle 10 may include at least one impact sensor 64 for sensing impact of the vehicle 10. The impact sensor 64 is in communication with the computer 58. The computer 58 may activate the inflator 48, e.g., provide an impulse to a pyrotechnic charge of the inflator 48 when the impact sensor 64 senses an impact of the vehicle 10. Alternatively or additionally to sensing impact, the impact sensor 64 may be configured to sense impact prior to impact, i.e., pre-impact sensing. The impact sensor 64 is configured to detect an impact to the vehicle 10. The impact sensor 64 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 64 may be located at numerous points in or on the vehicle.

The vehicle 10 may include an occupancy sensor 62 for determining whether an occupant is seated in the seat 14. The computer 58 deploys the airbag 20, i.e., activates the inflator 48, in response to a vehicle impact detected by the impact sensor 64 and occupancy of the seat identified by the occupancy sensor 62. Accordingly, in examples in which the vehicle 10 includes multiple seats 14 and associated airbag assemblies 18, the computer 58 may inflate only the airbags 20 associated with seats 14 that are occupied.

The computer 58 in FIG. 7 illustrates an example storage medium. Storage medium may be any non-transitory computer-readable storage medium or machine-readable storage medium, such as an optical, magnetic or semiconductor storage medium. In various implementations, storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

The vehicle includes a communication network 60 that can include a bus in the vehicle 10 such as a controller area network (CAN) or the like, and/or other wired and/or wireless mechanisms. Via the vehicle network, the computer may transmit messages to various devices in the vehicle and/or receive messages (e.g., CAN messages) from the various devices, e.g., sensors, an actuator, an human machine interface (HMI), etc. Alternatively or additionally, in cases where the computer actually comprises a plurality of devices, the vehicle communication network may be used for communications between devices represented as the computer in this disclosure. Further, as mentioned below, various controllers and/or sensors may provide data to the computer via the vehicle communication network 60.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle comprising:
a roof;
a seatback having a front and a back;
an airbag supported by the roof and inflatable downwardly from the roof to an inflated position surrounding the seatback;
the airbag having non-inflatable panels and inflatable chambers in alternating arrangement around the seatback in the inflated position; and
a widest one of the non-inflatable panels being adjacent the back of the seatback in the inflated position, the widest one of the non-inflatable panels being wider in a horizontal plane that the other non-inflatable panels.

2. The vehicle as set forth in claim 1, wherein the inflatable chambers are tubular.

3. The vehicle as set forth in claim 2, wherein the inflatable chambers are elongated downwardly relative to the roof.

4. The vehicle as set forth in claim 3, wherein the seatback includes a horizontal midline, the airbag inflatable downwardly from the roof to below the midline.

5. The vehicle as set forth in claim 3, wherein the non-inflatable panels are elongated downwardly relative to the roof.

6. The vehicle as set forth in claim 1, wherein the inflatable chambers are elongated downwardly relative to the roof.

7. The vehicle as set forth in claim 1, wherein the front of the seatback defines an occupant seating area, the seatback being between the occupant seating area and the widest one of the non-inflatable panels.

8. The vehicle as set forth in claim 7, wherein the seatback includes a first bolster and a second bolster spaced from each other horizontally with the occupant seating area therebetween, the widest one of the non-inflatable panels extending from the first bolster to the second bolster.

9. The vehicle as set forth in claim 8, wherein the airbag surrounds the occupant seating area in the inflated position.

10. The vehicle as set forth in claim 7, wherein the seatback includes a horizontal midline, the widest one of the non-inflatable panels extending downwardly below the midline.

11. The vehicle as set forth in claim 1, wherein the seatback has a first bolster and a second bolster spaced from each other horizontally, the widest one of the non-inflatable panels extending from the first bolster to the second bolster in the inflated position.

12. The vehicle as set forth claim 1, wherein the airbag is rotatable relative to the roof about an axis transverse to the roof.

13. The vehicle as set forth claim 12, further comprising a seat including the seatback, the seat being rotatable about an axis transverse to the roof.

14. The vehicle as set forth in claim 13, wherein the rotation of the airbag and rotation of the seat are synchronized.

15. The vehicle as set forth in claim 14, further comprising a computer having a processor and a memory storing instructions executable by the processor to rotate the airbag based on rotation of the seat.

16. The vehicle as set forth in claim 1, further comprising an inflator supported by the roof and connected to a plurality of the inflatable chambers.

17. An assembly comprising:
a housing; and
an airbag supported by the housing and inflatable away from the housing along an axis transverse to the housing;
the airbag having non-inflatable panels and inflatable chambers in alternating arrangement extending endlessly around the axis;
one of the non-inflatable panels being wider than the other non-inflatable panels in a plane transverse to the axis.

18. The assembly as set forth in claim 17, wherein the inflatable chambers are tubular.

19. The assembly as set forth in claim 17, wherein the inflatable chambers are elongated away from the housing.

20. The assembly as set forth in claim 17, further comprising a motor to rotate the airbag about the axis.

* * * * *